US009985783B2

(12) United States Patent
Kakutani

(10) Patent No.: US 9,985,783 B2
(45) Date of Patent: May 29, 2018

(54) INFORMATION PROCESSING APPARATUS AND INFORMATION PROCESSING METHOD FOR RESTORING APPARATUS WHEN ENCRYPTION KEY IS CHANGED

(71) Applicant: CANON KABUSHIKI KAISHA, Tokyo (JP)

(72) Inventor: Naoya Kakutani, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 14/841,214

(22) Filed: Aug. 31, 2015

(65) Prior Publication Data
US 2016/0065369 A1  Mar. 3, 2016

(30) Foreign Application Priority Data
Sep. 2, 2014 (JP) ................. 2014-178439

(51) Int. Cl.
*H04L 9/08* (2006.01)
*G06F 21/70* (2013.01)
*H04L 9/32* (2006.01)

(52) U.S. Cl.
CPC ............ *H04L 9/0897* (2013.01); *G06F 21/70* (2013.01); *H04L 9/3234* (2013.01)

(58) Field of Classification Search
CPC ............ H04L 9/0897; H04L 2209/127; H04L 9/3234; H04L 9/0894; H04L 9/0886; H04L 9/32; H04L 9/3226; H04L 9/16; G06F 11/1448; G06F 11/1456; G06F 11/1458; G06F 2221/0782; G06F 21/31; G06F 21/70; H04W 12/06; H04N 21/4753
See application file for complete search history.

(56) References Cited

U.S. PATENT DOCUMENTS

| | | | | |
|---|---|---|---|---|
| 5,844,497 A | * | 12/1998 | Gray ....................... | G06F 21/10 235/379 |
| 2002/0154772 A1 | * | 10/2002 | Morishita ............... | G06F 21/10 380/201 |
| 2004/0172534 A1 | * | 9/2004 | Ogata ..................... | G06F 21/79 713/164 |
| 2006/0155988 A1 | * | 7/2006 | Hunter ................... | G06F 21/575 713/164 |
| 2007/0234073 A1 | * | 10/2007 | Cromer ................. | G06F 21/575 713/193 |
| 2008/0025513 A1 | * | 1/2008 | Lietzke .................. | G06F 21/57 380/277 |
| 2008/0226080 A1 | * | 9/2008 | Li .......................... | G06F 21/57 380/277 |
| 2009/0210456 A1 | * | 8/2009 | Subramaniam ......... | G06F 21/57 |
| 2010/0202617 A1 | * | 8/2010 | Balakrishnan ........ | G06F 21/575 380/277 |

FOREIGN PATENT DOCUMENTS

JP          2004-240764 A       8/2004

* cited by examiner

*Primary Examiner* — Trong Nguyen

(74) *Attorney, Agent, or Firm* — Canon U.S.A., Inc. IP Division

(57) ABSTRACT

An information processing apparatus including a hardware security module includes a verification unit configured to verify whether an encryption key of the hardware security module is usable and a disabling unit configured to disable a user authentication function if the verification unit verifies that the encryption key is not usable.

11 Claims, 11 Drawing Sheets

FUNCTION RESTRICTION SETTINGS FOR THE TIME WHEN ENCRYPTION KEY IS NOT USABLE

CHECK FUNCTION(S) TO BE DISABLED IN FUNCTION RESTRICTION SETTINGS FOR THE TIME WHEN KEY DOES NOT MATCH

- 1011 — ☐ COPY FUNCTION
- 1012 — ☐ STORAGE SAVING FUNCTION
- 1013 — ☑ E-MAIL TRANSMISSION FUNCTION
- 1014 — ☑ FACSIMILE FUNCTION
- 1015 — ☑ REMOTE UI FUNCTION

| OK (1021) | CANCEL (1022) |

INFORMATION PROCESSING APPARATUS AND INFORMATION PROCESSING METHOD FOR RESTORING APPARATUS WHEN ENCRYPTION KEY IS CHANGED

BACKGROUND OF THE INVENTION

Field of the Invention

The present invention relates to an information processing apparatus, an information processing method, and a storage medium for prompt restoration of the apparatus in a case where an encryption key is changed due to replacement of a chip, etc. and a user authentication function cannot be used normally.

Description of the Related Art

An information processing apparatus such as a personal computer (PC), a multi-function peripheral (MFP) (digital multi-function peripheral) having a print function, etc. encrypts confidential data in the information processing apparatus and stores the encrypted confidential data therein.

In recent years, there has been an information processing apparatus that encrypts/decrypts confidential data within the information processing apparatus by use of an encryption key stored in an external hardware security module (HSM) that is physically connected to the information processing apparatus.

One example of the HSM to be used is a Trusted Platform Module (TPM) that complies with the Trusted Computing Group ((TCG) "http:www.trustedcomputinggroup.org") standard. The TPM is an anti-tamper security chip capable of securely managing an encryption key. In general, an apparatus including a TPM encrypts confidential data and securely manages a key used for the encryption within the TPM to realize secure management of the confidential data.

To use a TPM in an information processing apparatus, the TPM may be connected as an external chip to a hardware board included in the information processing apparatus. In this case, a backup of an encryption key (hereinafter, "TPM encryption key") managed in the external TPM is needed to prepare for an accident that the TPM is damaged, lost, etc. Normally, the TPM encryption key is backed up by connecting an external memory medium such as a universal serial bus (USB) to the information processing apparatus to acquire the TPM encryption key. In a case where the external TPM is damaged, the user replaces the TPM of the information processing apparatus with a new TPM and connects the external memory medium storing the TPM encryption key to restore the TPM encryption key.

From the point of view of security, only a user granted high authority such as system administrator authority of the information processing apparatus is normally allowed to execute operations to backup and restore the TPM encryption key. User identification/authentication is conducted by verification of an identifier (ID) and password information by a user authentication function provided by the information processing apparatus. The user password information stored in the information processing apparatus is confidential data. Thus, the user password information is encrypted with the TPM encryption key, and the encrypted user password information is stored.

In a case where the damaged TPM is replaced with the new TPM, the TPM encryption key in the new TPM chip is different from the TPM encryption key stored in the old TPM before the old TPM was damaged. Thus, the confidential data encrypted with the TPM encryption key stored in the old TPM in the information processing apparatus cannot be decrypted/used. In the information processing apparatus that the user authentication function is enabled, the password encrypted with the TPM encryption key cannot be decrypted. Thus, even a user having system administrator authority cannot log in to the information processing apparatus. Accordingly, an operation to restore the TPM encryption key cannot be executed.

Japanese Patent Application Laid-Open No. 2004-240764 discusses an information processing apparatus that prompts a user to select whether to activate the information processing apparatus in a safe mode in a case where an HSM such as a TPM has been replaced. If the user selects activation in the safe mode, the information processing apparatus is reactivated in the safe mode, and if an instruction to disable the user authentication function is given in the safe mode, the user authentication function is disabled, and the information processing apparatus is reactivated.

According to the technique discussed in Japanese Patent Application Laid-Open No. 2004-240764, however, it is required to install a safe mode function in the information processing apparatus. Furthermore, since the user is required to change the mode and repeat reactivation of the information processing apparatus, it takes time to execute the restoration processing.

SUMMARY OF THE INVENTION

The present invention is directed to enabling prompt restoration of an apparatus in a case where an encryption key is changed due to replacement of a hardware security module, etc. and a user authentication function cannot be used normally.

According to an aspect of the present invention, an information processing apparatus having a user authentication function includes a first hardware security module configured to store a key for encryption of confidential data, a verification unit configured to verify whether the key stored in the first hardware security module is usable, and a disabling unit configured to disable a user authentication function of the information processing apparatus based on a result of verification by the verification unit.

Further features of the present invention will become apparent from the following description of exemplary embodiments with reference to the attached drawings.

BRIEF DESCRIPTION OF THE DRAWINGS

FIG. 10 illustrates an example of a function restriction setting screen for the time when an encryption key is not usable.

DESCRIPTION OF THE EMBODIMENTS

Various exemplary embodiments of the present invention will be described below with reference to the drawings.

Figure 1:
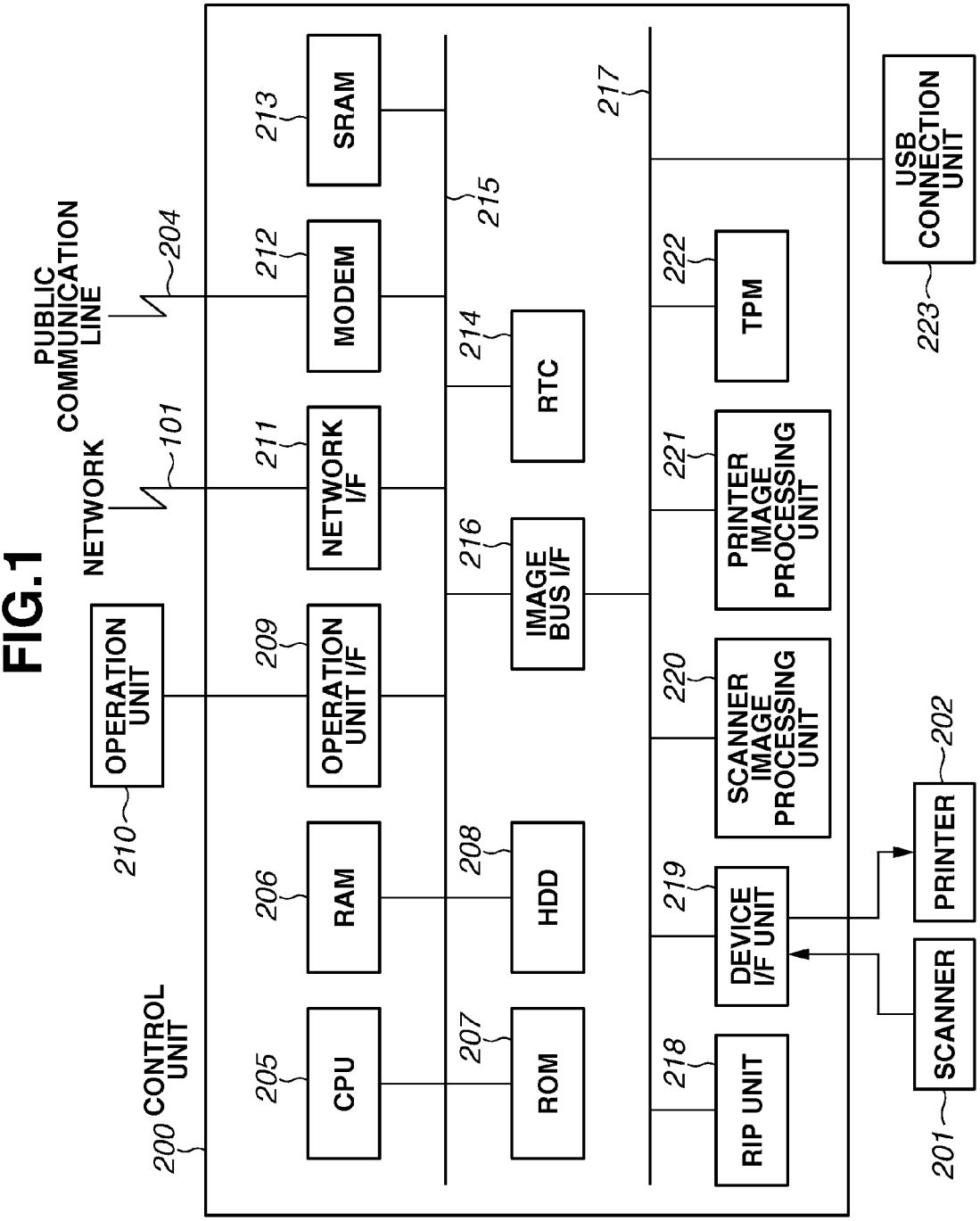
FIG. 1 illustrates an example of a hardware configuration of a multi-function peripheral.

FIG. 1 illustrates an example of a hardware configuration of a multi-function peripheral.

A control unit 200 is connected to a scanner 201, which is an image input device, and a printer 202, which is an image output device, and is also connected to a network 101 and a public communication line 204 to input and output image information and device information.

A central processing unit (CPU) 205 is a processor configured to comprehensively control the multi-function peripheral. A random access memory (RAM) 206 is a system work memory for the CPU 205 to operate. The RAM 206 is also a memory for temporarily storing image data, user information, a password, etc. A read-only memory (ROM) 207 is a boot ROM, and a system boot program is stored in the ROM 207. A hard disk drive (HDD) 208 is to store a system software program, an application program, and image data. Further, programs for flowcharts according to exemplary embodiments described below are also stored in the HDD 208.

The CPU 205 executes a program stored in the HDD 208 to realize processing of each step in flowcharts according to exemplary embodiments described below. The processing of each step in flowcharts described below can also be realized by execution of a program by a processor other than the CPU 205 or by the CPU 205 in cooperation with another processor.

An operation unit interface (I/F) 209 is an interface unit with an operation unit 210 including a touch panel. The operation unit I/F 209 outputs to the operation unit 210 image data to be displayed on the operation unit 210. Further, the operation unit I/F 209 has a role to transmit to the CPU 205 information input from the operation unit 210 by a user. A network I/F 211 is connected to the network 101 and inputs/outputs information. A modem 212 is connected to the public communication line 204 and inputs/outputs information. A static random-access memory (SRAM) 213 is a non-volatile recording medium capable of performing a high-speed operation. A real time clock (RTC) 214 is configured to perform processing to continue counting the current time even when no power is supplied to the control unit 200. The foregoing devices are arranged on a system bus 215.

An image bus I/F 216 is a bus bridge configured to connect the system bus 215 to an image bus 217, which transfers image data at high speed, and to convert a data configuration. The image bus 217 includes a peripheral component interconnect (PCI) bus or the Institute of Electrical and Electronics Engineers (IEEE) 1394. The following devices are arranged on the image bus 217. A raster image processor (RIP) unit 218 is configured to develop PDL codes into a bitmap image. A device I/F unit 219 connects the scanner 201 and the printer 202, which are an image input or output device, to the control unit 200, and performs synchronous/asynchronous conversion of image data. A scanner image processing unit 220 corrects, processes, and edits input image data. A printer image processing unit 221 performs printer correction, resolution conversion, etc. on print output image data. A trusted platform module (TPM) 222 provides a TPM encryption key. A universal serial bus (USB) connection unit 223 connects an external USB memory medium and inputs/outputs data. The TPM 222 is an example of a hardware security module.

Figure 2:
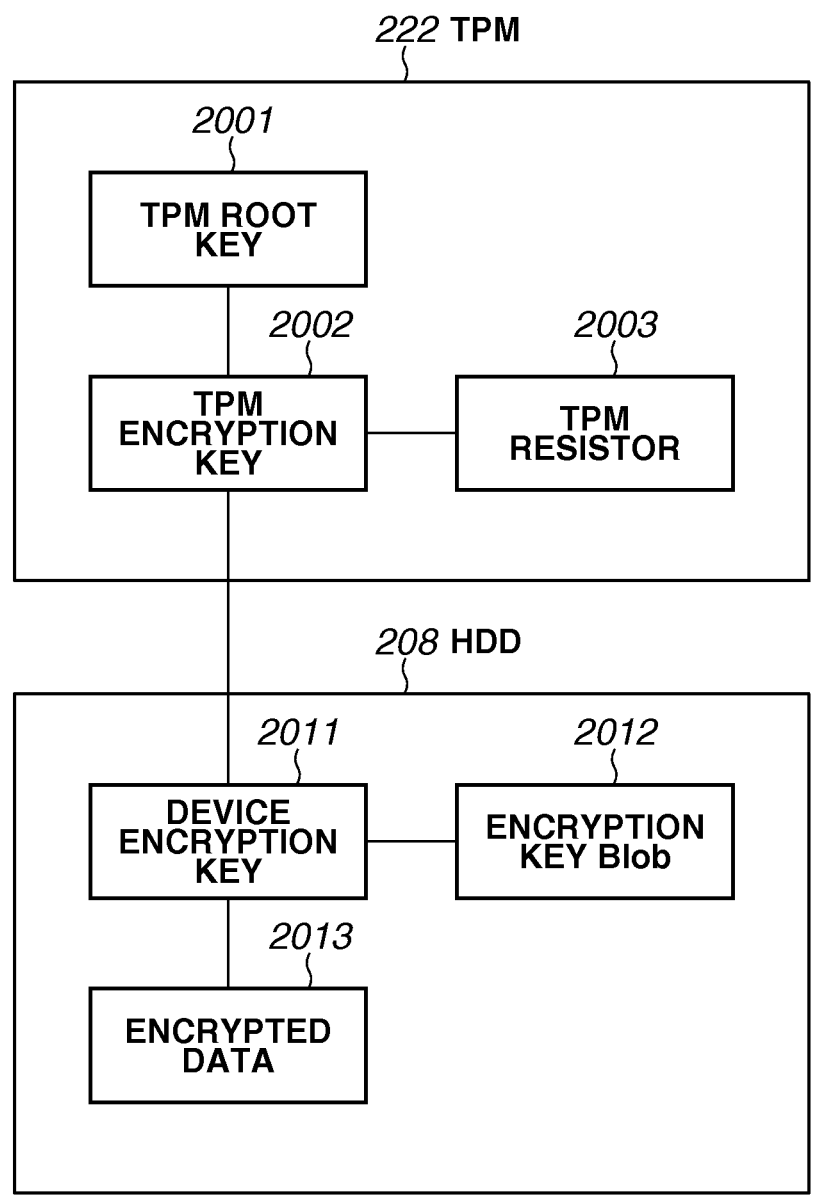
FIG. 2 illustrates a schematic configuration of encryption keys and confidential data to be handled by a trusted platform module (TPM) and a hard disk drive (HDD).

FIG. 2 illustrates a schematic configuration of an encryption key and confidential data handled by the TPM 222 and the HDD 208. The schematic configuration of the TPM 222 is illustrated in an upper part of FIG. 2. In the TPM 222, a TPM root key 2001, a TPM encryption key 2002, and a TPM resistor 2003 are recorded. The schematic configuration of the HDD 208 is illustrated in a lower part of FIG. 2. In the HDD 208, a device encryption key 2011, an encryption key Blob 2012, and encrypted data 2013 are recorded.

In the present exemplary embodiment, confidential data handled by the multi-function peripheral is encrypted with the device encryption key 2011. Examples of confidential data include, but are not limited to, image data and personal data such as an address book of the multi-function peripheral as well as encryption keys and certificates handled by application software of the multi-function peripheral, a password database included in a user authentication function, etc.

The device encryption key 2011 is encrypted with the TPM encryption key 2002. Further, the TPM encryption key 2002 is encrypted with the TPM root key 2001. The TPM root key 2001 cannot be rewritten, deleted, or acquired from outside, and can be used only for encryption. This series of encryption key chain realizes robust anti-tamper security. Further, when the TPM 222 is connected to the multi-function peripheral for the first time such as the time of the shipment from a factory, the TPM encryption key 2002 does not exist in the TPM 222, and when the multi-function peripheral is activated for the first time, the CPU 205 generates an encryption key and inputs the generated encryption key as the TPM encryption key to the TPM 222. In this way, the TPM encryption key 2002 is encrypted with the TPM root key 2001 and associated in the TPM 222. At the time when the CPU 205 inputs the TPM encryption key 2002 to the TPM 222, information about the TPM resistor 2003 is stored, and the encryption key Blob 2012 is acquired. They are used to verify the validity of the TPM encryption key and will be described below in the description of the processing illustrated in FIG. 8, etc.

The configurations of the keys in the present exemplary embodiment are mere examples, and not particularly limited. Examples of other arrangements include an arrangement in which the TPM root key does not exist in the TPM and only the TPM encryption key is stored. Further, the encryption keys in the TPM may be protected more robustly by an encryption key different from the TPM root key and the TPM encryption key. Furthermore, the confidential data in the HDD may be encrypted directly with the TPM encryption key instead of the device encryption key encrypted with the TPM encryption key.

Figure 3:
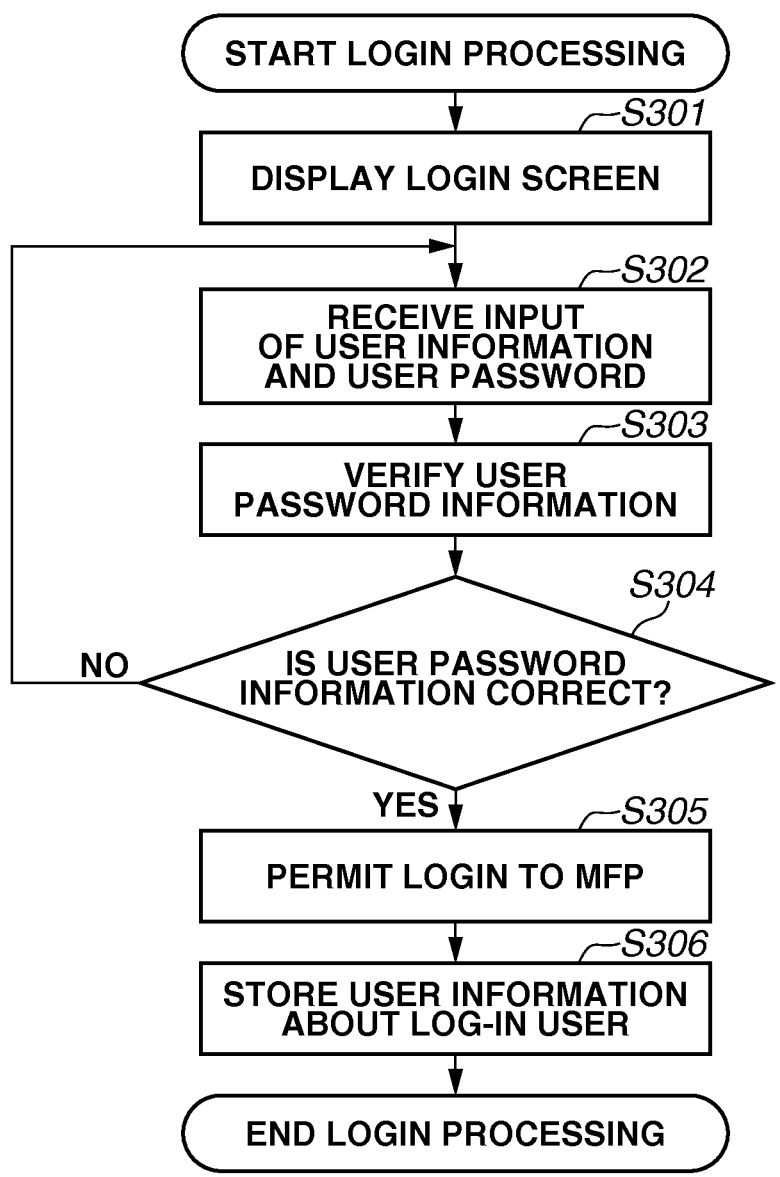
FIG. 3 is a flowchart illustrating an example of login processing.

The following describes the user authentication function using the TPM 222 of the multi-function peripheral according to the present exemplary embodiment, with reference to FIG. 3.

The login processing of the user authentication function of the multi-function peripheral starts from step S301 in FIG. 3.

In step S301, the CPU 205 displays a login screen on the operation unit 210. Then, the processing proceeds to step S302.

In step S302, the CPU 205 receives user input of user information and a password via the operation unit 210. The input user information and the input password are stored in the RAM 206. While the RAM 206 is used to temporarily store the user information and the password in the present exemplary embodiment, the device to store the user information and the password is not particularly limited and may be other devices such as the HDD 208, etc. Similarly, the device is also not particularly limited in exemplary embodiments described below. In the present exemplary embodiment, the CPU 205 encrypts with the device encryption key 2011 a password associated with user information managed by user authentication, and stores the encrypted password in the HDD 208.

In step S303, the CPU 205 acquires the encrypted password associated with the input user information from the HDD 208, decrypts the password, and compares the decrypted password with the input password to verify whether the input password is a correct password. Then, the processing proceeds to step S304. In the present exemplary embodiment, the CPU 205 decrypts the encrypted password with the device encryption key 2011. The device encryption key 2011 is encrypted with the TPM encryption key 2002 in the TPM 222. The CPU 205 inputs the encrypted device encryption key 2011 to the TPM 222 to acquire and use the device encryption key decrypted with the TPM encryption key 2002. Further, the TPM encryption key 2002 is encrypted with the TPM root key 2001, and when using the TPM encryption key 2002, the CPU 205 decrypts the TPM encryption key 2002 with the TPM root key 2001.

In step S304, the CPU 205 determines whether the input password is correct based on the verification result. If the CPU 205 determines that the input password is correct (YES in step S304), the processing proceeds to step S305. On the other hand, if the CPU 205 determines that the input password is not correct (NO in step S304), the CPU 205 displays an error message on the operation unit 210, and the processing returns to step S302.

In step S305, the CPU 205 permits login to the multi-function peripheral. Then, the processing proceeds to step S306.

In step S306, the CPU 205 stores the user information about the log-in user in the RAM 206.

The foregoing describes the flow of the login processing of the user authentication function of the multi-function peripheral. After the login processing ends, the user can use a function provided by the multi-function peripheral.

The setting information about whether the user authentication function is enabled/disabled is stored in the SRAM 213, and acquired or changed by the CPU 205 in response to an instruction from the user having system administrator authority via the operation unit 210.

The following describes a TPM encryption key backup function for the TPM encryption key 2002 in the TPM 222 in the present exemplary embodiment.

Figure 4:
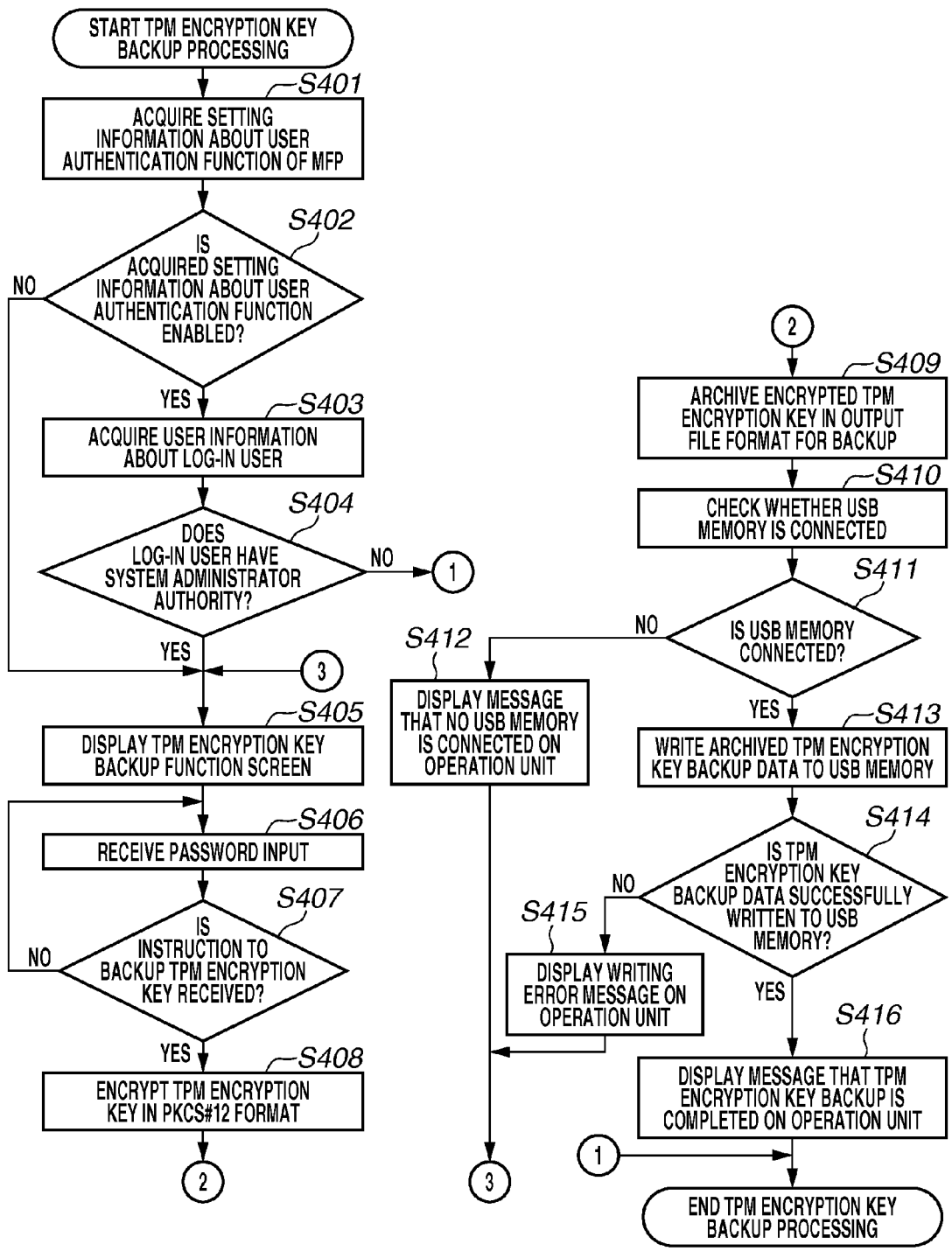
FIG. 4 is a flowchart illustrating an example of TPM encryption key backup processing.

The processing of the TPM encryption key backup function in the present exemplary embodiment starts from step S401 in FIG. 4.

In step S401, the CPU 205 acquires setting information about the user authentication function of the multi-function peripheral from the SRAM 213. Then, the processing proceeds to step S402.

In step S402, the CPU 205 determines whether the acquired setting information about the user authentication function is enabled. For example, if an item of the setting information that corresponds to the user authentication function is set to ON (e.g., 1), the CPU 205 determines that the acquired setting information is enabled. On the other hand, if the item is set to OFF (e.g., 0), the CPU 205 determines that the acquired setting information is disabled.

If the CPU 205 determines that the user authentication function is enabled (YES in step S402), the processing proceeds to step S403. On the other hand, if the CPU 205 determines that the user authentication function is disabled (NO in step S402), the processing proceeds to step S405.

In step S403, the CPU 205 acquires user information about the log-in user such as a user ID, user authority information, etc. Then, the processing proceeds to step S404.

In step S404, the CPU 205 determines whether the log-in user has system administrator authority based on the acquired user information. If the user authority information in the user information indicates that the log-in user has system administrator authority, the CPU 205 determines that the log-in user has system administrator authority. On the other hand, if the user authority information in the user information does not indicate that the log-in user has system administrator authority, the CPU 205 determines that the log-in user does not have system administrator authority.

If the CPU 205 determines that the log-in user has system administrator authority (YES in step S404), the processing proceeds to step S405. On the other hand, if the CPU 205 determines that the log-in user does not have system administrator authority (NO in step S404), the processing of the TPM encryption key backup function ends. In other words, the CPU 205 does not allow the log-in user having no system administrator authority to use the TPM encryption key backup function.

In the present exemplary embodiment, only a log-in user having system administrator authority is allowed to use the TPM encryption key backup function. Alternatively, the CPU 205 can restrict the users of the TPM encryption key backup function based on other conditions such as predetermined individual user IDs, etc. instead of the system administrator authority.

In step S405, the CPU 205 displays a TPM encryption key backup function screen 501 on the operation unit 210. Then, the processing proceeds to step S406.

Figure 5:
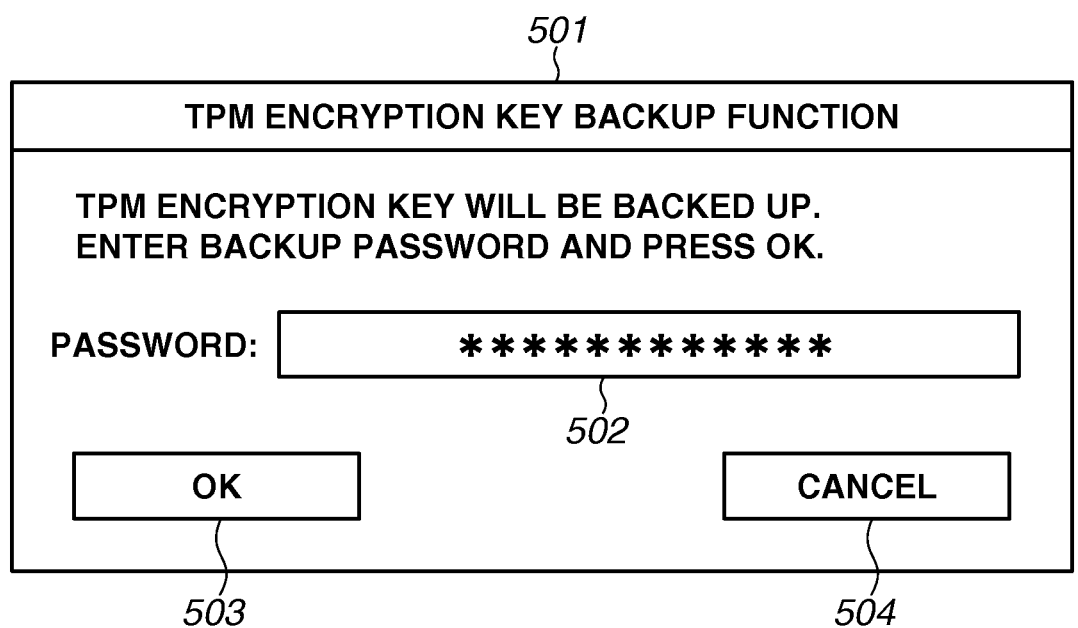
FIG. 5 illustrates an example of a TPM encryption key backup function screen.

FIG. 5 illustrates an example of a TPM encryption key backup function screen 501. The TPM encryption key backup function screen 501 includes a TPM encryption key backup password input box 502 where a password for the time of the backup of the TPM encryption key for encryption is to be input, a backup execution button 503, and a backup cancellation button 504 for encryption at the time of the backup and is to receive operations from the operation unit 210.

In step S406, the CPU 205 receives input of a password for the time of the backup of the TPM encryption key via the operation unit 210. The CPU 205 displays in the TPM encryption key backup password input box 502 the password input via the operation unit 210 such that each character is masked with the symbol "*." Then, the processing proceeds to step S407.

In step S407, the CPU 205 determines whether an instruction to back up the TPM encryption key is received. At this time, the CPU 205 receives a backup execution instruction together with the password input at a press of the backup execution button 503 via the operation unit 210.

If the CPU 205 determines that a backup instruction is received (YES in step S407), the processing proceeds to step S408. On the other hand, if the CPU 205 determines that no backup instruction is received (NO in step S407), the processing returns to step S406.

In step S408, the CPU 205 encrypts the TPM encryption key based on the input password. In the present exemplary embodiment, the encryption using the password is executed in public key cryptography standard #12 (PKCS#12) format. Then, the processing proceeds to step S409.

In step S409, the CPU 205 formats the encrypted TPM encryption key in an output file format for backup, and archives the formatted encrypted TPM encryption key. In the present exemplary embodiment, the CPU 205 adds to a file to be output an identification header for identification of the file as a file of the encrypted TPM encryption key at the time of restoration of the TPM encryption key, which will be described below, and the CPU 205 archives the file. Such data is referred to as TPM encryption key backup data in the present exemplary embodiment. Then, the processing proceeds to step S410.

In step S410, the CPU 205 checks whether a USB memory is connected to the USB connection unit 223. Then, the processing proceeds to step S411.

In step S411, the CPU 205 determines whether a USB memory is connected to the USB connection unit 223 based on a result of the checking in step S410. If the CPU 205 determines that a USB memory is connected to the USB connection unit 223 (YES in step S411), the processing proceeds to step S413. On the other hand, if the CPU 205 determines that no USB memory is connected to the USB connection unit 223 (NO in step S411), the processing proceeds to step S412.

In step S412, the CPU 205 displays on the operation unit 210 a message that no USB memory is connected. Then, the processing proceeds to step S405.

In step S413, the CPU 205 writes the archived TPM encryption key backup data to the USB memory. Then, the processing proceeds to step S414.

In step S414, the CPU 205 determines whether the TPM encryption key backup data is successfully written to the USB memory. If the CPU 205 determines that the TPM encryption key backup data is successfully written to the USB memory (YES in step S414), the processing proceeds to step S416. On the other hand, if the CPU 205 determines that the TPM encryption key backup data is not successfully written to the USB memory (NO in step S414), the processing proceeds to step S415.

In step S415, the CPU 205 displays a writing error message on the operation unit 210. Then, the processing proceeds to step S405.

In step S416, the CPU 205 displays on the operation unit 210 a message that the backup of the TPM encryption key is completed. Then, the TPM encryption key backup processing ends. The foregoing describes the flow of the TPM encryption key backup processing.

The following describes a TPM encryption key restoration function to the TPM 222 in the present exemplary embodiment.

Figure 6:
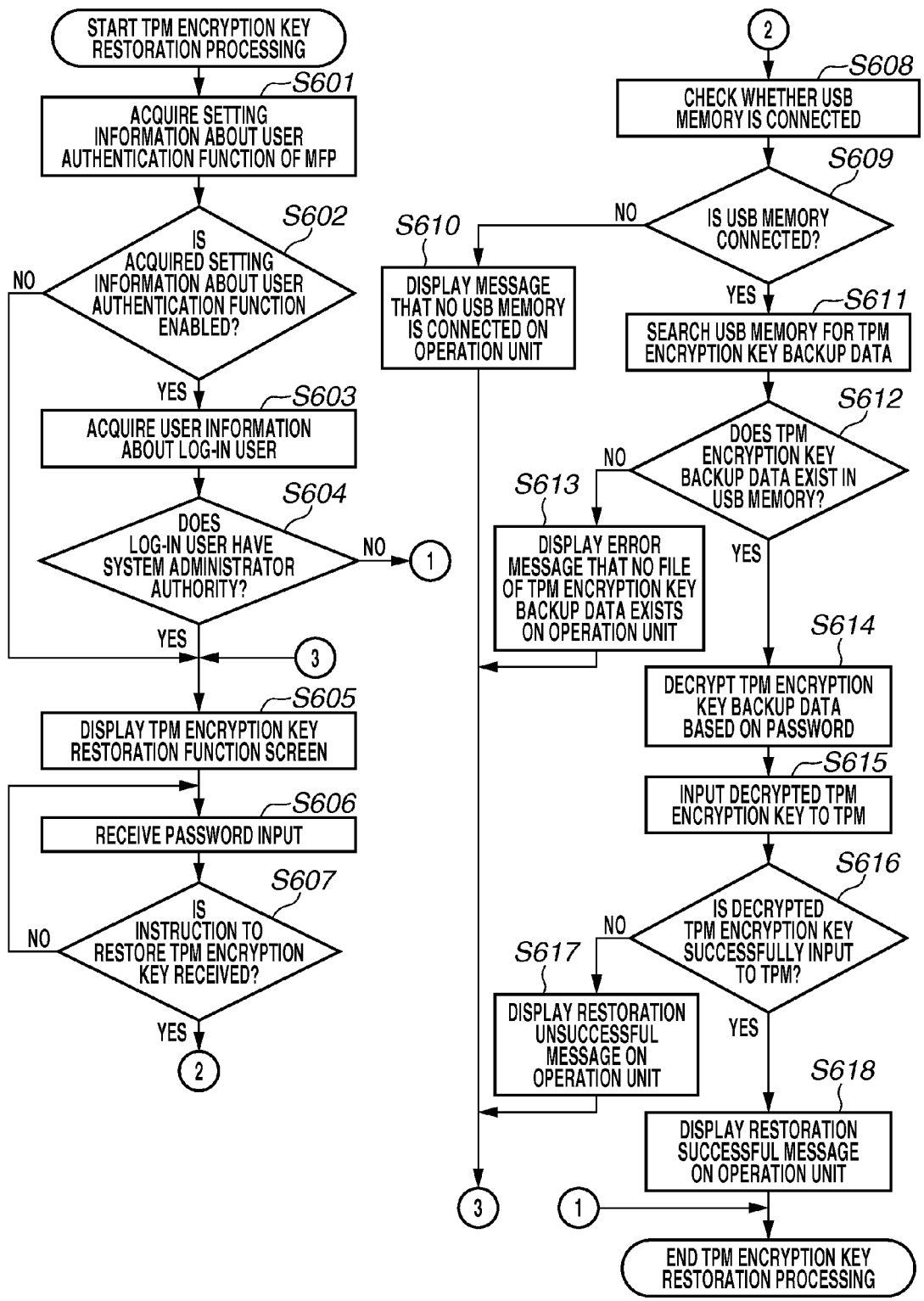
FIG. 6 is a flowchart illustrating an example of TPM encryption key restoration processing.

The processing of the TPM encryption key restoration function in the present exemplary embodiment starts from step S601 in FIG. 6.

In step S601, the CPU 205 acquires the setting information about the user authentication function of the multifunction peripheral from the SRAM 213. Then, the processing proceeds to step S602.

In step S602, the CPU 205 determines whether the acquired setting information about the user authentication function is enabled. For example, if an item of the setting information that corresponds to the user authentication function is set to ON (e.g., 1), the CPU 205 determines that the acquired setting information is enabled. On the other hand, if the item is set to OFF (e.g., 0), the CPU 205 determines that the acquired setting information is disabled.

If the CPU 205 determines that the user authentication function is enabled (YES in step S602), the processing proceeds to step S603. On the other hand, if the CPU 205 determines that the user authentication function is disabled (NO in step S602), the processing proceeds to step S605.

In step S603, the CPU 205 acquires user information about the log-in user such as a user ID, user authority information, etc. Then, the processing proceeds to step S604.

In step S604, the CPU 205 determines whether the log-in user has system administrator authority based on the acquired user information. If the user authority information in the user information indicates that the log-in user has system administrator authority, the CPU 205 determines that the log-in user has system administrator authority. On the other hand, if the user authority information in the user information does not indicate that the log-in user has system administrator authority, the CPU 205 determines that the log-in user does not have system administrator authority.

If the CPU 205 determines that the log-in user has system administrator authority (YES in step S604), the processing proceeds to step S605. On the other hand, if the CPU 205 determines that the log-in user does not have system administrator authority (NO in step S604), the processing of the TPM encryption key restoration function ends. In other words, the CPU 205 does not allow the log-in user having no system administrator authority to use the TPM encryption key restoration function.

In the present exemplary embodiment, only a log-in user having system administrator authority is allowed to use the TPM encryption key restoration function. Alternatively, the CPU 205 can restrict the users of the TPM encryption key restoration function based on other conditions such as predetermined individual user IDs, etc. instead of the system administrator authority.

In step S605, the CPU 205 displays a TPM encryption key restoration function screen 701 on the operation unit 210. Then, the processing proceeds to step S606.

Figure 7:
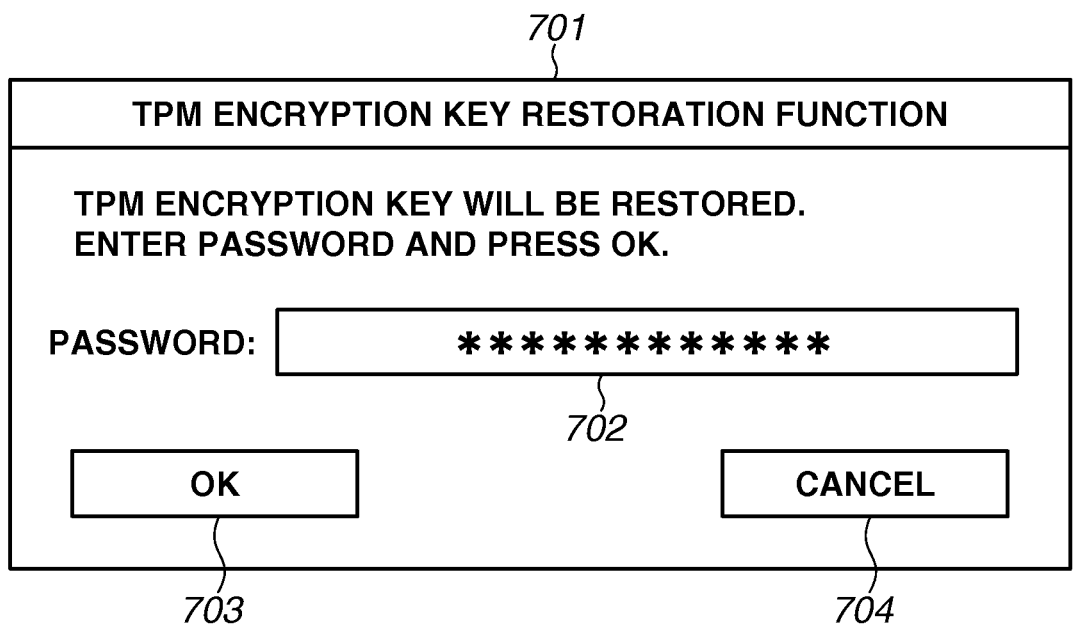
FIG. 7 illustrates an example of a TPM encryption key restoration function screen.

FIG. 7 illustrates an example of a TPM encryption key restoration function screen 701. The TPM encryption key restoration function screen 701 includes a TPM encryption key restoration password input box 702, a restoration execution button 703, and a restoration cancellation button 704, and receives operations from the operation unit 210.

In step S606, the CPU 205 receives input of the password for the time of the restoration of the TPM encryption key via the operation unit 210. The CPU 205 displays in the TPM encryption key restoration password input box 702 the password input from the operation unit 210 such that each character is masked with the symbol "*." Then, the processing proceeds to step S607.

In step S607, the CPU 205 determines whether an instruction to restore the TPM encryption key is received. At this time, the CPU 205 receives a restoration execution instruction together with the password input at a press of the restoration execution button 703 via the operation unit 210.

If the CPU 205 determines that a restoration instruction is received (YES in step S607), the processing proceeds to step S608. On the other hand, if the CPU 205 determines that no restoration instruction is received (NO in step S607), the processing returns to step S606.

In step S608, the CPU 205 checks whether a USB memory is connected to the USB connection unit 223. Then, the processing proceeds to step S609.

In step S609, the CPU 205 determines whether a USB memory is connected to the USB connection unit 223 based on a result of the checking in step S608. If the CPU 205 determines that a USB memory is connected to the USB connection unit 223 (YES in step S609), the processing proceeds to step S611. On the other hand, if the CPU 205 determines that no USB memory is connected to the USB connection unit 223 (NO in step S609), the processing proceeds to step S610.

In step S610, the CPU 205 displays on the operation unit 210 a message that no USB memory is connected. Then, the processing proceeds to step S605.

In step S611, the CPU 205 searches the USB memory for TPM encryption key backup data. Then, the processing proceeds to step S612.

In step S612, the CPU 205 determines whether TPM encryption key backup data exists in the USB memory based on a result of the search. In the present exemplary embodiment, the CPU 205 determines whether the TPM encryption key backup data exists in the USB memory based on information about the identification header included in the TPM encryption key backup data. If the CPU 205 determines that the TPM encryption key backup data exists in the USB memory (YES in step S612), the processing proceeds to step S614. On the other hand, if the CPU 205 determines that the TPM encryption key backup data does not exist in the USB memory (NO in step S612), the processing proceeds to step S613.

In step S613, the CPU 205 displays on the operation unit 210 an error message that no file of TPM encryption key backup data exists. Then, the processing proceeds to step S605.

In step S614, the CPU 205 decrypts the TPM encryption key backup data based on the password input in step S606. Then, the processing proceeds to step S615.

In step S615, the CPU 205 inputs the decrypted TPM encryption key to the TPM 222 and enables the use of the TPM encryption key in the TPM 222. In the present exemplary embodiment, the input TPM encryption key is encrypted and associated with the TPM root key 2001 in the TPM 222. In this way, even if the TPM is replaced, it is still possible to decrypt the encrypted data 2013 in the HDD 208, and the TPM encryption key can robustly be protected by the TPM root key. Then, the processing proceeds to step S616.

In step S616, the CPU 205 determines whether the TPM encryption key is successfully input to the TPM 222. The CPU 205 performs the determination of whether the TPM encryption key is successfully input to the TPM 222 based on OK/NG information returned to the CPU 205 from the TPM 222.

If the CPU 205 determines that the TPM encryption key is successfully input to the TPM 222 (YES in step S616), the processing proceeds to step S618. On the other hand, if the CPU 205 determines that the TPM encryption key is not successfully input to the TPM 222 (NO in step S616), the processing proceeds to step S617.

In step S617, the CPU 205 displays a restoration unsuccessful message on the operation unit 210. Then, the processing proceeds to step S605.

In step S618, the CPU 205 displays a restoration successful message on the operation unit 210. Then, the processing of the TPM encryption key restoration function ends.

In the present exemplary embodiment, in a case where the TPM encryption key is successfully input to the TPM 222, the CPU 205 receives the encryption key Blob 2012 from the TPM 222 and stores the received encryption key Blob 2012 in the SRAM 213. Further, the TPM 222 stores the information about the encryption key Blob 2012 in the TPM resistor 2003. The information about the encryption key Blob 2012 and the information about the TPM resistor 2003 are used in the verification of the validity of the TPM encryption key. Details of the processing will be described below with reference to FIG. 8.

The foregoing describes the flow of the TPM encryption key restoration processing.

The following describes validity verification processing for the verification of the validity of the TPM encryption key and user authentication function setting changing processing at the time of activation of the multi-function peripheral in the present exemplary embodiment.

Figure 8:
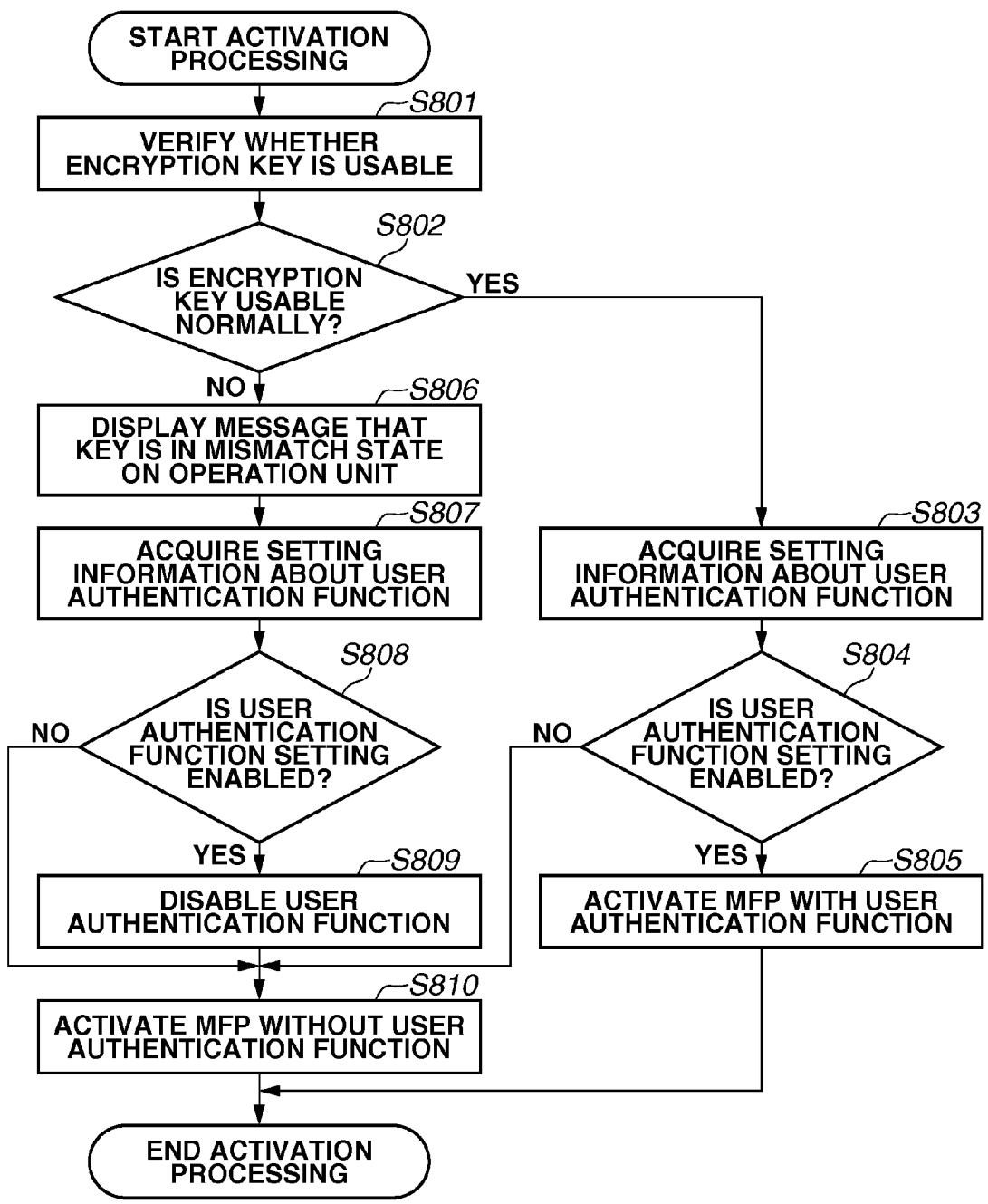
FIG. 8 is a flowchart illustrating an example of activation processing according to a first exemplary embodiment.

The validity verification processing for the verification of the validity of the TPM encryption key and the user authentication function setting changing processing at the time of activation of the multi-function peripheral in the present exemplary embodiment start from step S801 in FIG. 8. The multi-function peripheral is activated in response to an instruction from the operation unit 210 or the network 101 to activate the multi-function peripheral in a power-supply disconnected state or a sleep state. Specifically, in response to the instruction, the CPU 205 reads a system boot program from the ROM 207, executes the boot program, reads system software or an application program from the HDD 208, and executes the system software or the application program. In this way, the functions included in the multi-function peripheral can be provided to the user.

In step S801, the CPU 205 verifies the validity of the encryption key. In the present exemplary embodiment, the validity of the TPM encryption key 2002 and the device encryption key 2011 is to be verified. The validity verification is the verification of whether the TPM encryption key 2002 is a key obtained by encrypting the device encryption key 2011 and whether the device encryption key 2011 can be correctly decrypted and used. As described above, the TPM encryption key 2002 of the TPM 222 is input from the CPU 205 and encrypted into the TPM root key 2001. At the time of the input to the TPM 222, the CPU 205 acquires the encryption key Blob 2012 from the TPM 222. The validity of the encryption key is checked by inputting the encryption key Blob 2012 to the TPM 222. Information about the encryption key Blob 2012 is stored in the TPM resistor 2003 in the TPM 222, and the TPM 222 compares the information about the input encryption key Blob 2012 with the information stored in the TPM resistor 2003 to perform the verification. In this way, the TPM 222 confirms that the TPM encryption key 2002 in the TPM 222 is associated with the device encryption key 2011. The foregoing processing to confirm the validity of the encryption key is a mere example according to the present exemplary embodiment and is not a limiting example. Another example may be processing in which a copy of the device encryption key is stored in the TPM resistor 2003 and the CPU 205 inputs the device encryption key 2011 to compare the device encryption key 2011 with the device encryption key stored in the TPM resistor to thereby confirm that the device encryption key in the HDD 208 is associated with the TPM encryption key in the TPM 222.

Then, the processing proceeds to step S802.

The process of step S801 is an example of the verification processing for the verification of whether the TPM encryption key 2002 is usable.

In step S802, the CPU 205 determines whether the encryption key is usable normally based on a result of the encryption key validity verification performed in step S801. If the CPU 205 determines that the encryption key is usable normally (YES in step S802), the processing proceeds to step S803. On the other hand, if the CPU 205 determines that the encryption key is not usable normally (NO in step S802), the processing proceeds to step S806.

In step S803, the CPU 205 acquires the setting information about the user authentication function from the SRAM 213. Then, the processing proceeds to step S804.

In step S804, the CPU 205 determines whether the user authentication function is enabled based on the acquired setting information about the user authentication function.

In step S804, the CPU 205 determines whether the acquired setting information about the user authentication function is enabled. For example, if an item of the setting information that corresponds to the user authentication function is set to ON (e.g., 1), the CPU 205 determines that the user authentication function is enabled. On the other hand, if the item is set to OFF (e.g., 0), the CPU 205 determines that the user authentication function is disabled.

If the CPU 205 determines that the user authentication function is enabled (YES in step S804), the processing proceeds to step S805. On the other hand, if the CPU 205 determines that the user authentication function is disabled (NO in step S804), the processing proceeds to step S810.

In step S805, the CPU 205 activates the multi-function peripheral with the user authentication function. Then, the activation processing ends.

Steps S803, S804, and S805 indicate the processing of normal activation in the state in which the encryption key of the multi-function peripheral is usable normally.

On the other hand, in step S806, the CPU 205 displays on the operation unit 210 a message that the key is in a mismatch state. Then, the processing proceeds to step S807.

In step S807, the CPU 205 acquires the setting information about the user authentication function from the SRAM 213. Then, the processing proceeds to step S808.

In step S808, the CPU 205 determines whether the user authentication function setting is enabled based on the acquired setting information about the user authentication function.

If the CPU 205 determines that the user authentication function is enabled (YES in step S808), the processing proceeds to step S809. On the other hand, if the CPU 205 determines that the user authentication function is disabled (NO in step S808), the processing proceeds to step S810.

In step S809, the CPU 205 disables the user authentication function in the setting information in the SRAM 213. For example, the CPU 205 sets an item of the setting information that corresponds to the user authentication function to OFF (e.g., 0).

In step S810, the CPU 205 activates the multi-function peripheral without the user authentication function. Then, the CPU 205 ends the activation processing.

In the present exemplary embodiment, as described above, the password to be handled in the user authentication function is encrypted with the device encryption key 2011 in the HDD 208. Then, the device encryption key 2011 is encrypted with the TPM encryption key 2002 in the TPM 222. Thus, in a case where the TPM is replaced due to damage, etc., the TPM encryption key in the replaced TPM and the device encryption key in the current HDD are in the mismatch state, so that the device encryption key cannot be used normally, and the password of the user authentication function cannot be decrypted normally. Accordingly, as described above with reference to FIG. 6, when the user authentication function is enabled, the TPM restoration function, which requires user authentication, is not usable. Thus, steps S808 to S810 are performed to disable the user authentication function and then activate the multi-function peripheral so that the TPM restoration function becomes usable.

The foregoing describes the control for providing the restoration function by disabling the user authentication in a case where the encryption key in the HSM such as the TPM is not usable normally and the user authentication function of the information processing apparatus in which the user authentication function is enabled cannot be used properly.

The control enables provision of a solution for restoration of an encryption key even in an information processing apparatus including no second OS mode such as a safe mode in a case where the encryption key is not usable normally, whereby the service performance and the convenience of the apparatus can be improved.

The following describes a second exemplary embodiment.

In the first exemplary embodiment described above, in a case where the user authentication function of the multi-function peripheral managed by the user authentication is not usable because the encryption key is not usable normally, the user authentication function is disabled to provide the TPM encryption key restoration. In the configuration according to the first exemplary embodiment, however, since the user authentication function is disabled, the user can use not only the TPM encryption key restoration function but also a copy function, an email transmission function, a facsimile function, a network communication function, etc. without authentication. In the first exemplary embodiment, since the restoration of the TPM encryption key after the replacement of the TPM is performed as a series of processing, a case where any user is allowed to use the multi-function peripheral without restoration of the TPM encryption key after the replacement of the TPM is not considered.

However, there may be a case where an administrator desires to restrict the functions to be performed in cooperation with an external device, such as the email transmission, the network communication function, etc. from a point of view of security.

In the second exemplary embodiment, the control by which the use of a function to be restricted is disabled when the user authentication function is disabled to enable the use of the TPM encryption key restoration function in a case where the user authentication function is not usable because the encryption key is not usable normally will be described.

The following describes TPM encryption key validity verification processing, the user authentication function setting changing processing, and function restriction processing at the time of the activation of the multi-function peripheral in the second exemplary embodiment.

Unless otherwise stated, the configurations of the multi-function peripheral and the TPM 222, the login processing, the TPM encryption key backup processing, the TPM encryption key restoration processing, etc. that are not described in the present exemplary embodiment are similar to those in the first exemplary embodiment.

Figure 9:
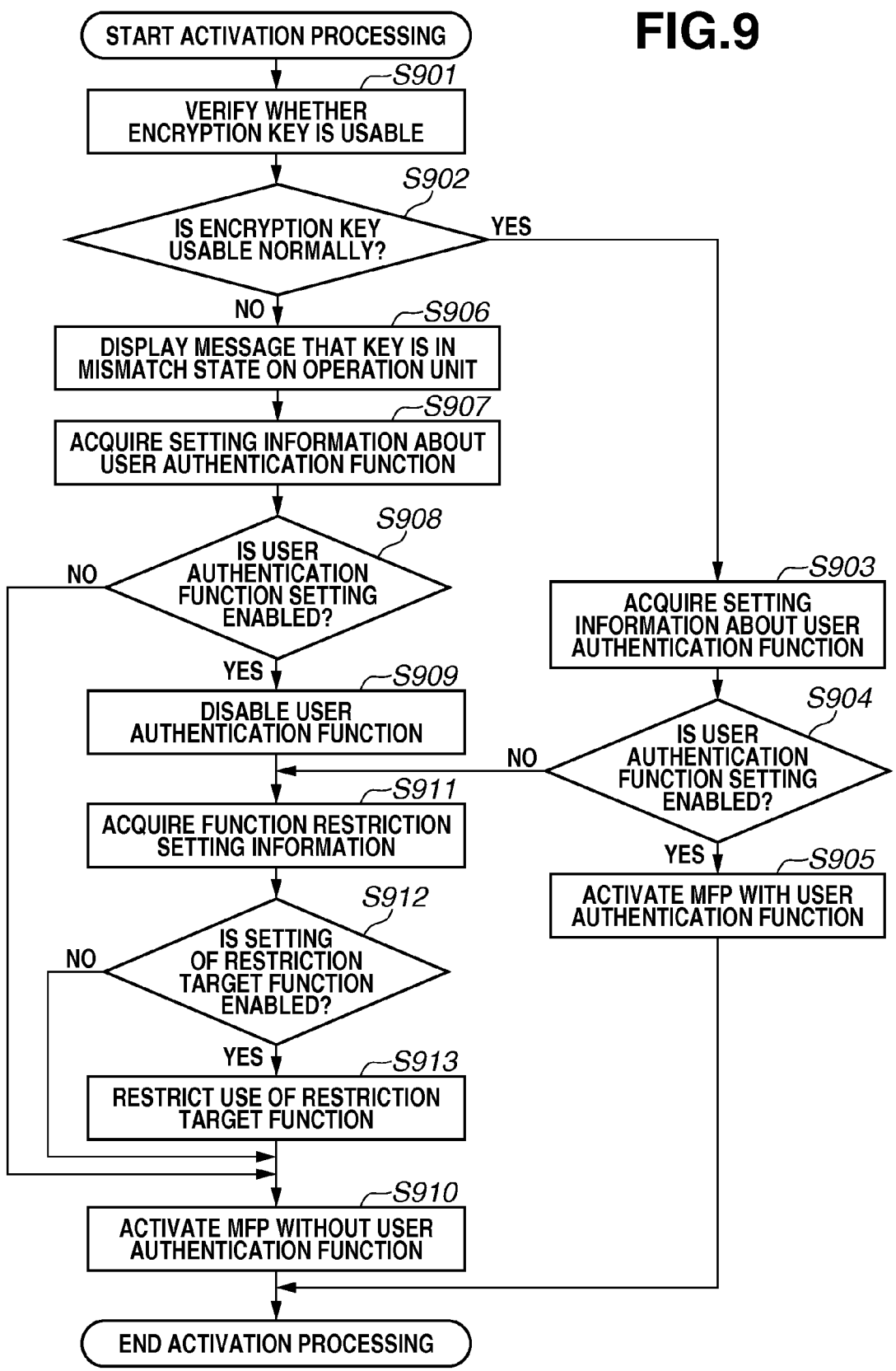
FIG. 9 is a flowchart illustrating an example of activation processing according to a second exemplary embodiment.

In the processing illustrated in FIG. 9 according to the present exemplary embodiment, steps S911 to S913 are added to the steps in the processing illustrated in FIG. 8 according to the first exemplary embodiment. The added steps relate to the control for disabling a target function according to function restriction setting information after the user authentication function is disabled. Details of the added steps will be described below. Steps S901 to S910 in the flowchart illustrated in FIG. 9 according to the present exemplary embodiment are similar to steps S801 to S810 in the flowchart illustrated in FIG. 8 according to the first exemplary embodiment. The processing illustrated in FIGS. 3, 4, and 6 are similar to those in the first exemplary embodiment.

Points that are changed in the second exemplary embodiment from the first exemplary embodiment will be described below.

Following the process of step S909, or if the determination result in step S904 is NO, the processing proceeds to step S911.

In step S911, the CPU 205 acquires from the SRAM 213 function restriction setting information for the time when the encryption key is not usable. Then, the processing proceeds to step S912.

FIG. 10 illustrates an example of a function restriction setting screen 1001 for the time when the encryption key is not usable in the second exemplary embodiment. The function restriction setting screen 1001 is displayed on the operation unit 210. The function restriction setting screen 1001 includes restriction enabling/disabling settings 1011 to 1015 for the respective functions of the multi-function peripheral, a function restriction setting reflection execution button 1021, and a function restriction setting reflection cancellation button 1022. In the present exemplary embodiment, the copy function, a storage saving function, the email transmission function, the facsimile function, and a remote UI function are the functions included in the multi-function peripheral and can be enabled or disabled by restriction enabling/disabling settings 1011 to 1015, respectively. The user can change the restriction enabling/disabling setting of a function by checking a check box of the function via the operation unit 210. Further, if the CPU 205 receives a press of the function restriction setting reflection execution button 1021 via the operation unit 210, the CPU 205 writes to the SRAM 213 setting information relating to the setting checked in the check box. The CPU 205 disables the provision of the function corresponding to the checked check box, when the encryption key can no longer be used and the user authentication setting information is changed from the enabled state to the disabled state.

FIG. 10 illustrates an example in which email transmission function restriction setting information 1013, facsimile function restriction setting information 1014, and remote UI function restriction setting information 1015, which perform transmission and reception to and from an external device, are checked and are to be restricted. The functions of the multi-function peripheral, the functions to be restricted, and the granularity of the setting information in the present exemplary embodiment are mere examples and are not particularly limited. For example, instead of separate check boxes for the respective functions, one check box may be provided to designate a plurality of functions in advance as functions to be restricted. Alternatively, a function or setting other than the TPM encryption key restoration function that a system administrator is allowed to operate may be restricted, or a function or setting that a guest user is not allowed to operate may be restricted.

For example, with respect to a function corresponding to the checked check box, the CPU 205 describes ON (e.g., 1) with respect to the corresponding item of the function restriction setting information for the time when the encryption key is not usable.

In step S912, the CPU 205 checks the function restriction setting information for the time when the encryption key is not usable, which is received from the SRAM 213, and the CPU 205 determines whether the setting of a restriction target function is enabled. Specifically, the CPU 205 determines whether there is a function the provision of which is set to be restricted based on the function restriction setting information for the time when the encryption key is not usable.

For example, if an item of the acquired function restriction setting information that corresponds to a function is set to ON (e.g., 1), the CPU 205 determines that the setting of the restriction target function is enabled.

If the CPU 205 determines that the setting of the restriction target function is enabled (YES in step S912), the processing proceeds to step S913. On the other hand, if the CPU 205 determines that the setting of the restriction target function is not enabled (NO in step S912), the processing proceeds to step S910.

In step S913, the CPU 205 restricts the use of the restriction target function. For example, in a case where a function the use of which is to be restricted is a function to be operated by the user via the operation unit 210, the CPU 205 masks a UI button for the function. Further, in a case where a function the use of which is to be restricted is a function using a network such as a remote UI function, etc., the CPU 205 blocks a communication request. The process of step S913 is an example of the function disabling processing for disabling a target function.

By the processes of steps S911 to S913, the use of a restriction target function can be disabled in a case where the encryption key is not usable normally and the user authentication function is disabled to enable the use of the TPM encryption key restoration function. In this way, an apparatus administrator can conduct a more secure function restriction operation while enabling the use of the TPM encryption key restoration function.

The foregoing describes the control according to the second exemplary embodiment.

The following describes a third exemplary embodiment.

In the first and second exemplary embodiments described above, in a case where the user authentication function is not usable because the encryption key is not usable normally in the multi-function peripheral managed by user authentication, the user authentication function is automatically disabled at the time of the activation and the use of the TPM encryption key restoration function by the user is enabled.

However, the TPM encryption key restoration function is executable only when an external memory medium such as a USB memory in which the TPM encryption key backup data is stored is connected to the apparatus. In a case of restricting a specific function of the apparatus when the encryption key is not usable as in the second exemplary embodiment, a stricter security operation may be demanded such as an operation in which the user authentication function is disabled only under the condition where the TPM encryption key restoration function is executable.

In the third exemplary embodiment, in a case where the user authentication function is not usable because the encryption key is not usable normally, the user authentication is disabled and the use of the TPM encryption key restoration function is enabled only if it is determined that a USB memory in which the TPM encryption key backup data is stored is connected.

The following describes points that are changed in the third exemplary embodiment from the second exemplary embodiment.

Figure 11:
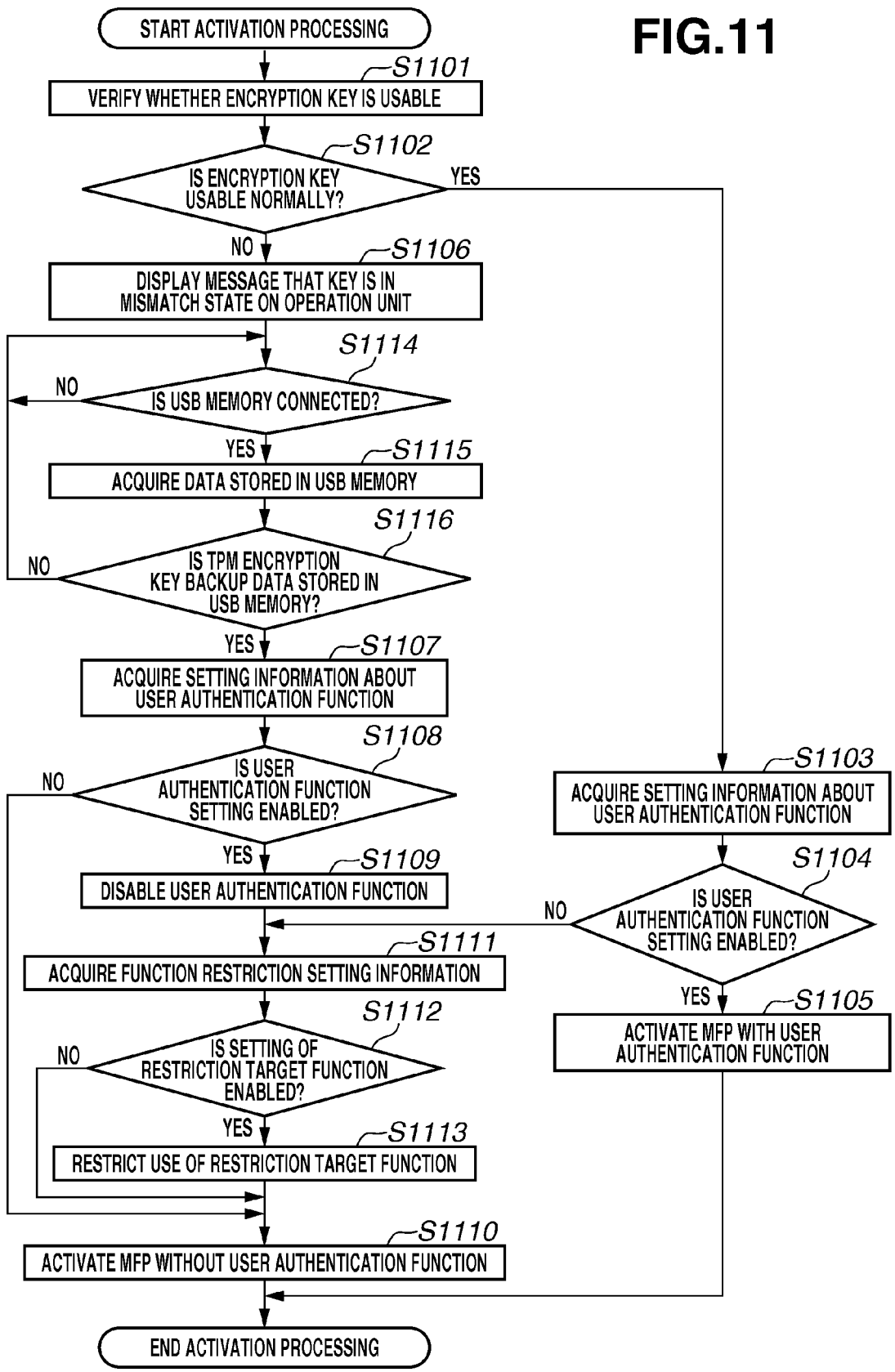
FIG. 11 is a flowchart illustrating an example of activation processing according to a third exemplary embodiment.

In the processing illustrated in FIG. 11 according to the present exemplary embodiment, steps S1114 to S1116 are added to the steps in the processing illustrated in FIG. 9 according to the second exemplary embodiment. The added steps relate to the control for disabling the user authentication function according to the connection of a USB memory storing the TPM encryption key backup data and for enabling the use of the TPM encryption key restoration function. Details of the added steps will be described below. Steps S1101 to S1113 in the flowchart illustrated in FIG. 11 according to the present exemplary embodiment are similar to steps S901 to S913 in the flowchart illustrated in FIG. 9 according to the second exemplary embodiment. The processing illustrated in FIGS. 3, 4, and 6 are similar to those in the first and second exemplary embodiments.

Following the process in step S1106, the processing proceeds to step S1114.

In step S1114, the CPU 205 determines whether a USB memory is connected to the USB connection unit 223.

If the CPU 205 determines that a USB memory is connected to the USB connection unit 223 (YES in step S1114), the processing proceeds to step S1115. On the other hand, if the CPU 205 determines that no USB memory is connected to the USB connection unit 223 (NO in step S1114), step S1114 is repeated.

In step S1115, the CPU 205 acquires data stored in the USB memory. Then, the processing proceeds to step S1116.

In step S1116, the CPU 205 determines whether the TPM encryption key backup data is stored in the USB memory. In the present exemplary embodiment, the identification header is added to the TPM encryption key backup data. Thus, the CPU 205 determines whether data is the TPM encryption key backup data based on the presence/absence of the identification header.

If the CPU 205 determines that the TPM encryption key backup data is not stored in the USB memory (NO in step S1116), the processing returns to step S1114. On the other hand, if the CPU 205 determines that the TPM encryption key backup data is stored in the USB memory (YES in step S1116), the processing proceeds to step S1107.

The process of step S1116 is an example of the backup data determination processing.

By the processes of steps S1114 to S1116, the user authentication is disabled and the use of the TPM encryption key restoration function is enabled only if it is determined that a USB memory in which the TPM encryption key backup data is stored is connected in a case where the encryption key is not usable normally. In this way, a stricter condition for disabling the user authentication function and for enabling the execution of the TPM encryption key restoration function can be set to realize the security operation while the convenience of the TPM encryption key restoration is maintained.

The foregoing describes the third exemplary embodiment.

According to each of the foregoing exemplary embodiments, an apparatus can be restored promptly even when the user authentication function is not usable normally in a case where an encryption key has been changed due to the replace of a chip, etc. In the first and second exemplary embodiments described above, the MFP (digital multi-function peripheral) is used as an example of the information processing apparatus to which a TPM can be connected and that can use the TPM and has the user authentication function. However, the information processing apparatus is not limited to the MFP, and may be, for example, a PC, a server, etc.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-178439, filed Sep. 2, 2014, which is hereby incorporated by reference herein in its entirety.

What is claimed is:

1. An information processing apparatus having a user authentication function, the information processing apparatus comprising:
    a first hardware security module comprising a memory configured to store an encryption key used to encrypt confidential data comprising information to perform the user authentication function;
    a verification engine configured to verify whether the encryption key stored in the first hardware security module is correct;
    a disabling engine configured to disable the user authentication function of the information processing apparatus responsive to the verification engine verifies that the encryption key stored in the first hardware security module is not correct;
    a display engine configured to display a notification on a display of the information processing apparatus after the disablement of the user authentication function;
    a backup engine configured to back up the encryption key stored in the first hardware security module onto an external memory; and
    a restoration engine configured to restore the encryption key backed up onto the external memory in a second hardware security module after the first hardware security module is replaced by the second hardware security module.

2. The information processing apparatus according to claim 1, wherein the confidential data includes password information to be used to determine whether a user has administrator authority when the user authentication function is executed.

3. The information processing apparatus according to claim 2, wherein in a case where the user authentication function is enabled, the information processing apparatus conducts restoration by the restoration engine under an instruction from an authenticated user having the administrator authority.

4. The information processing apparatus according to claim 1, wherein in a case where processing to activate the information processing apparatus starts, the verification engine verifies whether the encryption key stored in the first hardware security module is correct.

5. The information processing apparatus according to claim 1, wherein the display engine displays, in a case where the verification engine verifies that the encryption key stored in the first hardware security module is not correct, a message that the encryption key stored in the first hardware security module is in a mismatching state.

6. The information processing apparatus according to claim 1, further comprising a determination engine configured to determine, in a case where the verification engine verifies that the encryption key stored in the first hardware security module is not correct, whether the user authentication function is enabled based on setting information about the user authentication function,
wherein in a case where the determination engine determines that the user authentication function is enabled, the disabling engine disables a target function based on setting information about the target function.

7. The information processing apparatus according to claim 6, further comprising a setting engine configured to set setting information.

8. The information processing apparatus according to claim 1, further comprising a backup data determination engine configured to determine, in a case where the verification engine verifies that the encryption key stored in the first hardware security module is not correct, whether backup data of the encryption key stored in the first hardware security module exists in an external memory connected to the information processing apparatus.

9. The information processing apparatus according to claim 1, wherein the information processing apparatus is a multi-function peripheral having at least a print function.

10. A method of controlling an information processing apparatus having a user authentication function and including a first hardware security module configured to store an encryption key used to encrypt confidential data comprising information to perform the user authentication function, the method comprising:
verifying whether the encryption key stored in the first hardware security module is correct;
disabling the user authentication function of the information processing apparatus responsive to the verification determining that the encryption key stored in the first hardware security module is not correct;
displaying a notification on a display of the information processing apparatus after the disablement of the user authentication function;
backing up the encryption key stored in the first hardware security module onto an external memory; and
restoring the encryption key backed up onto the external memory in a second hardware security module after the first hardware security module is replaced by the second hardware security module.

11. A non-transitory storage medium storing a program for causing an information processing apparatus having a user authentication function and including a first hardware security module configured to store an encryption key used to encrypt confidential data comprising information to perform the user authentication function, to execute the program to perform a method comprising:
verifying whether the encryption key stored in the first hardware security module is correct;
disabling the user authentication function of the information processing apparatus responsive to the verification determining that the encryption key stored in the first hardware security module is not correct;
displaying a notification on a display of the information processing apparatus after the disablement of the user authentication function;
backing up the encryption key stored in the first hardware security module onto an external memory; and
restoring the encryption key backed up onto the external memory in a second hardware security module after the first hardware security module is replaced by the second hardware security module.

* * * * *